US010626632B2

(12) United States Patent
Sauber et al.

(10) Patent No.: US 10,626,632 B2
(45) Date of Patent: Apr. 21, 2020

(54) MOBILE UTILITY POLE

(71) Applicant: Sauber Manufacturing Company, Virgil, IL (US)

(72) Inventors: James Sauber, Sycamore, IL (US); Milan Krpan, Jr., Sycamore, IL (US); Joshua Minnihan, Sycamore, IL (US); Julio Ortega, Maple Park, IL (US)

(73) Assignee: Sauber Manufacturing Company, Virgil, IL (US)

( * ) Notice: Subject to any disclaimer, the term of this patent is extended or adjusted under 35 U.S.C. 154(b) by 0 days.

(21) Appl. No.: 16/133,767

(22) Filed: Sep. 18, 2018

(65) Prior Publication Data

US 2019/0093382 A1 Mar. 28, 2019

Related U.S. Application Data

(60) Provisional application No. 62/562,800, filed on Sep. 25, 2017.

(51) Int. Cl.
| | | |
|---|---|---|
| *E04H 12/34* | (2006.01) | |
| *B60S 9/02* | (2006.01) | |
| *B60P 3/00* | (2006.01) | |
| *E04H 12/18* | (2006.01) | |
| *B62D 63/08* | (2006.01) | |

(52) U.S. Cl.
CPC ............. *E04H 12/345* (2013.01); *B60P 3/00* (2013.01); *B60S 9/02* (2013.01); *E04H 12/187* (2013.01); *B62D 63/08* (2013.01)

(58) Field of Classification Search
CPC ..... E04H 12/345; E04H 12/187; B62D 63/08; B60S 9/02; B60P 3/00
See application file for complete search history.

(56) References Cited

U.S. PATENT DOCUMENTS

| | | | | |
|---|---|---|---|---|
| 4,466,506 | A * | 8/1984 | Dolenti ................... | H02G 1/02 |
| | | | | 182/2.1 |
| 4,602,462 | A * | 7/1986 | Anderson ............. | B66F 11/044 |
| | | | | 182/2.9 |
| 5,076,449 | A * | 12/1991 | Clutter .................. | B66F 11/044 |
| | | | | 182/2.1 |
| 5,538,207 | A * | 7/1996 | O'Connell ............... | H02G 1/04 |
| | | | | 182/2.11 |
| 6,966,448 | B1 * | 11/2005 | Burkett ................... | B66C 23/38 |
| | | | | 212/180 |
| 7,134,562 | B2 | 11/2006 | Burkett | |
| 7,814,725 | B2 | 10/2010 | Kwon | |
| 7,866,927 | B1 | 1/2011 | Wong | |
| 8,555,563 | B1 | 10/2013 | Wong | |

(Continued)

FOREIGN PATENT DOCUMENTS

CN 103321471 9/2013

*Primary Examiner* — Basil S Katcheves
*Assistant Examiner* — Omar F Hijaz
(74) *Attorney, Agent, or Firm* — Ballard Spahr LLP

(57) ABSTRACT

A mobile pole for temporary support of one or more electrical lines includes a boom assembly mounted on a wheeled trailer. The boom assembly includes a plurality of segments pivotably attached to one another. Actuators acting between the segments effect pivoting motion to deploy and stow the segments. A utility pole having one or more cross members is mounted on a free end of one of the segments. The utility pole is rotatable about its longitudinal axis to orient the cross members relative to the electrical lines.

18 Claims, 8 Drawing Sheets

FIG. 1A

(56) References Cited

U.S. PATENT DOCUMENTS

| | | | |
|---|---|---|---|
| 8,763,973 B2 * | 7/2014 | Musselman | H02G 1/02 |
| | | | 182/2.11 |
| 9,938,117 B2 | 4/2018 | Fritel et al. | |
| 2015/0083983 A1 * | 3/2015 | Yi | H02G 1/06 |
| | | | 254/134.3 R |
| 2015/0292227 A1 * | 10/2015 | Gorney | E04H 12/182 |
| | | | 52/114 |
| 2016/0001832 A1 * | 1/2016 | Beiler | B62D 59/04 |
| | | | 414/550 |

* cited by examiner

MOBILE UTILITY POLE

CROSS REFERENCE TO RELATED APPLICATIONS

This application is based upon and claims benefit of priority to U.S. Provisional Application No. 62/562,800, filed Sep. 25, 2017 which provisional application is hereby incorporated by reference herein.

FIELD OF THE INVENTION

This invention relates to an apparatus used to provide temporary support for electrical power lines and other utilities.

BACKGROUND

Utility poles used to support overhead electrical power lines and associated components (transformers, street lights and the like) or other public utilities such as cable and fiber optic cable must be replaced periodically, either as part of a maintenance program or in response to damage from storms or vehicles. Replacement of poles is asset intensive, requiring specialized equipment including truck mounted cranes and bucket trucks even to replace a single pole damaged by a vehicular collision. However, demand for such assets, for example, to effect repairs after a storm, may strain the capabilities of even the most well equipped utility company, leaving some customers without power while they wait their turn for the equipment to fix a downed pole. Additionally, if any excavation is required for even a temporary repair, permission to dig must be cleared with a utility or other clearing house to avoid damage to underground infrastructure such as gas or telephone lines. This lengthens the time required to effect repair. Furthermore, replacing utility poles in urban areas may require double the amount of equipment be used because space is limited and thus a replacement pole must go into the same hole as the original pole. When space is limited a first crane is needed to remove the original pole and hold it so that it remains in the line while a second crane positions the replacement pole in the hole. The power lines are then transferred from the original pole to the replacement pole.

There is clearly an opportunity to improve the process of replacing utility poles by decreasing the assets required and by using assets which are less expensive than those used in current practice.

SUMMARY

The invention concerns a mobile pole for temporary support of electrical lines. In one example embodiment, the mobile pole comprises a trailer comprising a base mounted on a plurality of wheels. A boom assembly has a terminal end pivotably mounted on the trailer, and a free end. At least a first actuator acts between the trailer and the boom assembly for pivoting the boom assembly relatively to the trailer. A utility pole is mounted on the boom assembly. The utility pole comprises a column having a first end attached to the free end of the boom assembly and a second end oppositely disposed. At least a first cross member is attached to the utility pole proximate the second end of the column.

In a particular example embodiment, the boom assembly comprises a plurality of boom segments pivotably attached to one another. The plurality of boom segments includes a terminal boom segment, comprising the terminal end of the boom assembly, and a free boom segment, comprising the free end of the boom assembly. A plurality of actuators extends between the boom segments for effecting pivoting motion of the boom segments.

Further by way of example, the boom assembly comprises an intermediate boom segment having one end pivotably attached to the terminal boom segment and an opposite end pivotably attached to the free boom segment; and wherein the plurality of actuators comprises a second actuator acting between the terminal boom segment and the intermediate boom segment and a third actuator acting between the intermediate boom segment and the free boom segment. By way of example the actuators may comprise hydraulic actuators.

In an example embodiment the column is rotatably attached to the free end of the free boom segment for rotation about a longitudinal axis of the column. An actuator acts between the free boom segment and the column for effecting rotation of the column about the longitudinal axis. In an example embodiment the actuator comprises a hydraulic actuator. Further by way of example, a second cross piece may be attached to the utility pole in spaced relation to the first cross piece.

Further by way of example, a mobile pole according to the invention comprises a motor mounted on the trailer, a hydraulic pump mounted on the trailer and driven by the motor. The hydraulic pump is in fluid communication with the hydraulic actuators. A control unit controls the motor, the hydraulic pump and the hydraulic actuators in this embodiment. The motor may be selected from the group consisting an electrical motor and an internal combustion engine. In a specific example embodiment, the motor comprises an electrical motor, and the mobile pole further comprises an electrical battery mounted on the trailer. The battery powers the electrical motor in this example. The example may further comprise an electrical generator mounted on the trailer for recharging the battery. In a specific example the electrical generator comprises an internal combustion engine. Additionally by way of example, at least one solar panel may be mounted on the trailer for recharging the battery. Further by way of example, a battery charger may be mounted on the trailer. The battery charger is connectable with any one of an electrical generator, and direct electrical service for recharging the battery.

In an example embodiment, the control unit is mounted on the trailer. In another embodiment, the control unit comprises a remote unit separate from the trailer. The remote unit in this example comprises a radio frequency transmitter for wirelessly controlling the mobile pole.

By way of example, the utility pole comprises fiberglass or wood A further example embodiment comprises a clamp attached to the free end of the boom assembly. The clamp holds the utility pole to the free end of the boom assembly. Additionally by way of example, a plurality of leveling legs may be attached to the trailer.

A specific example embodiment comprises a least a first gusset plate attached to the boom assembly, the first actuator acting between the trailer and the first gusset plate. Additionally by way of example, a plurality of gusset plates may be used. Each gusset plate is attached to a respective boom segment in this example. The actuators are attached to the boom segments via the gusset plates. At least one of the gusset plates is pivotably attached to one of the boom segments.

A further example embodiment comprises a pedestal mounted on the trailer. The pedestal extends therefrom and the terminal end of the boom assembly is mounted on the pedestal.

A specific example embodiment further comprises at least one roller assembly mounted on the cross member. An example roller assembly comprising a bracket. A latch is mounted on the bracket and is movable between an open and a closed position. A plurality of rollers are mounted on the bracket for engaging at least one of the electrical lines.

In another example embodiment, the boom assembly comprises a plurality of boom segments telescopically positioned one within another. In this example, the plurality of boom segments include a terminal boom segment comprising the terminal end of the boom assembly and a free boom segment comprising the free end of the boom assembly. The boom segments are movable relatively to one another along a longitudinal axis of the terminal boom segment. A plurality of actuators extend between the boom segments to effect motion of the boom segments along the longitudinal axis of the terminal boom segment.

By way of example the boom assembly may comprise an intermediate boom segment telescopically positioned within the terminal boom segment. The free boom segment is telescopically positioned within the intermediate boom segment. A second actuator acts between the terminal boom segment and the intermediate boom segment. A third actuator acts between the intermediate boom segment and the free boom segment.

DETAILED DESCRIPTION

Figure 1:
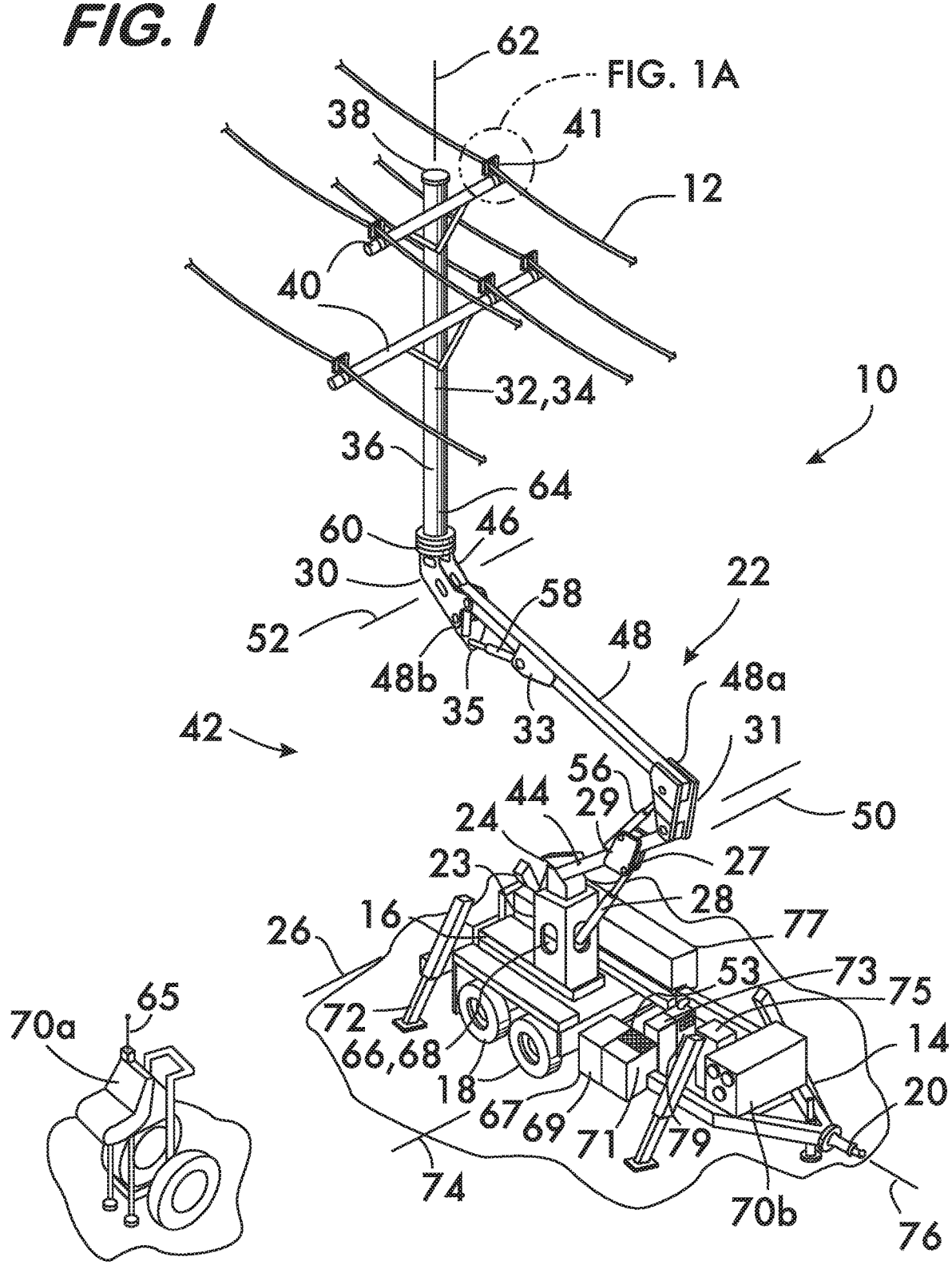
FIG. 1 is an isometric view of an example embodiment of a mobile utility pole according to the invention.
Figure 2:
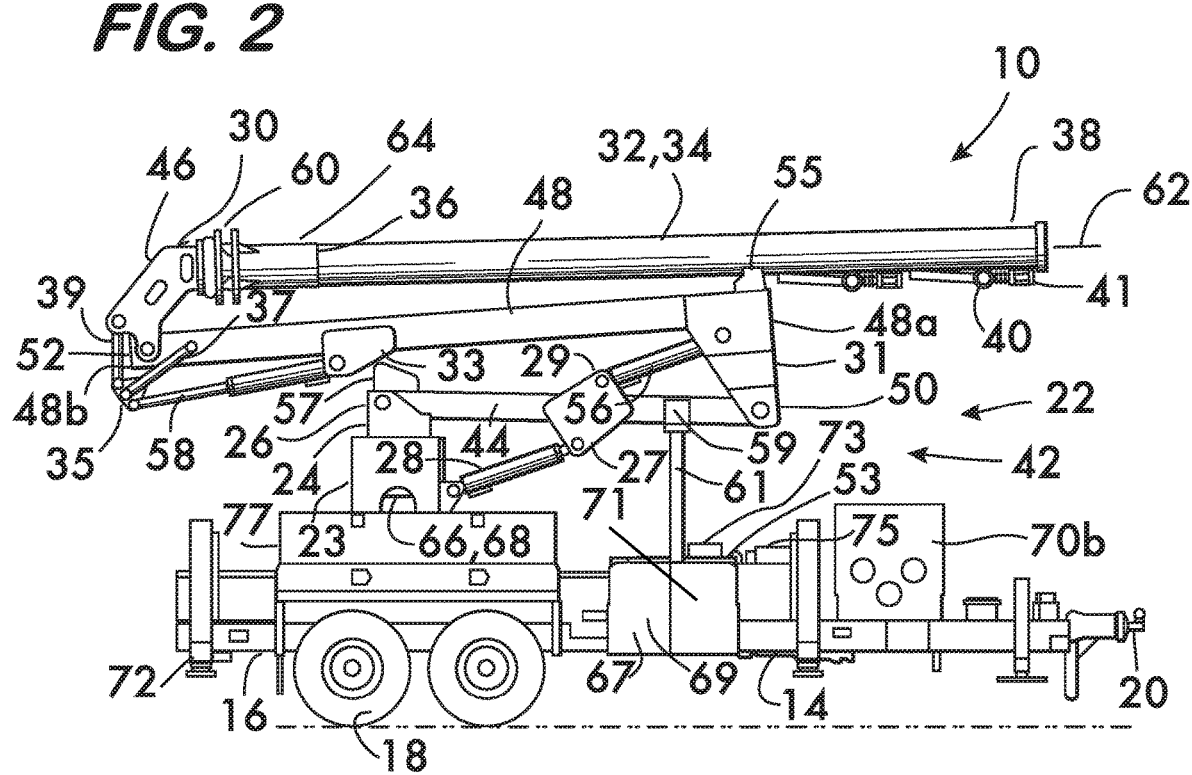
FIG. 2 is a side view showing the mobile utility pole of FIG. 1 in its travel configuration.

FIGS. 1 and 2 show an example embodiment of a mobile pole 10 for temporary support of electrical lines 12 (also referred to as "circuits"). Mobile pole 10 comprises a trailer 14. Trailer 14 comprises a base 16 mounted on a plurality of wheels 18. A hitch mechanism 20 is attached to the base to permit trailer 14 to be towed behind a vehicle (not shown).

Figure 1A:
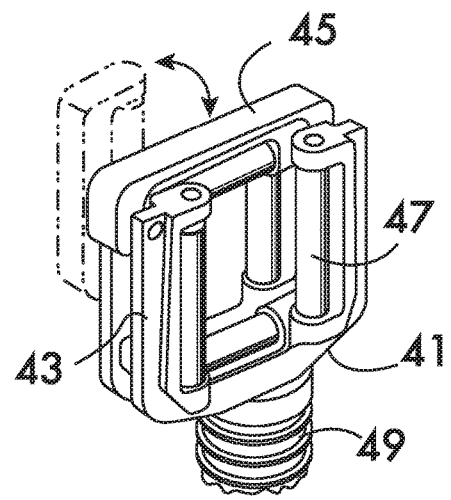
FIG. 1A shows a component of the mobile utility pole on an enlarged scale.

A boom assembly 22 is mounted on base 16 via a pedestal 23. Boom assembly 22 has a terminal end 24 which is pivotably mounted on the pedestal 23 for pivoting motion about an axis 26. A first actuator 28 acts between the pedestal 23 and the boom assembly 22 for pivoting it about axis 26. Boom assembly 22 also has a free end 30 on which a utility pole 32 is mounted. Utility pole 32 comprises a column 34 having a first end 36 attached to the free end 30 of the boom assembly 22. A second end 38 of the column 34 is oppositely disposed from the first end 36. At least a first cross member 40 is attached to the utility pole proximate to the second end 38 of the column 34. Additional cross members 40 may also be attached to column 34 in spaced relation to one another, the cross members carrying different circuits when present. FIG. 1A shows in detail a roller assembly 41 which supports the wire 12. Roller assembly 41 comprises a bracket 43 with a pivoting latch 45 which is movable to an open position (shown in broken line) to permit a wire 12 to be positioned on rollers 47. Roller assembly 41 is attached to the cross member 40 by an insulator 49. The rollers 47 minimize friction between the bracket 43 and the wires 12 when the utility pole is deployed. In this example embodiment the utility pole is made of a fiberglass pulltrusion. In another embodiment the pole may be made of wood and advantageously cut from a portion of a standard wooden utility pole. This provides for commonality of components and hardware with those already in use by the utility company.

As shown in FIG. 1, boom assembly 22 comprises a plurality of boom segments 42 pivotably attached to one another. In the example embodiment shown, boom assembly 22 comprises: 1) a terminal boom segment 44 which includes the terminal end 24 of the boom assembly; 2) a free boom segment 46 which includes the free end 30 of the boom assembly to which the utility pole 32 is attached; and 3) an intermediate boom segment 48. One end, 48a, of intermediate boom segment 48 is pivtotably attached to the terminal boom segment 44 for pivoting motion about an axis 50; an opposite end, 48b, of intermediate boom segment 48 is pivotably attached to the free boom segment 46 for pivoting motion about an axis 52.

As shown in FIG. 2 a plurality of actuators extend between the boom segments to effect their pivoting motion. In this example a second actuator 56 acts between terminal boom segment 44 and the intermediate boom segment 48. A third actuator 58 acts between intermediate boom segment 48 and the free boom segment 46. In an example embodiment the actuators 28, 56 and 58 are hydraulic. In a practical design, the actuators may have a 2.5 inch bore, a 1.5 inch rod diameter with a 24 inch stroke and operate at about 3000 psi. Other forms of actuator, such as electro-mechanical actuators, are also feasible.

As shown in FIG. 2, the actuators 28, 56 and 58 operate between gusset plates attached to the booms. The attachments between the actuators and the gussets are pin joints which permit relative rotation between the actuator and the gussets to which it is attached. Actuator 28 operates between pedestal 23 and a gusset plate 27 affixed to the terminal boom segment 44. Actuator 56 acts between a gusset plate 29 affixed to the terminal boom segment 44 and a gusset plate 31 affixed to the intermediate boom segment 48 and also pivotably attached to terminal boom segment 44 at pivot axis 50. Actuator 58 acts between a gusset plate 33 affixed to the intermediate boom segment 48 and gusset plate 35 which is pivotably attached to both the intermediate boom segment 48 and the free boom segment 46 via respective pivoting links 37 and 39. Use of the various gusset plates simplifies the attachment of the actuators to the booms and provides mechanical advantage and/or a desired angular boom rotation for a given actuator stroke. The gussets may be further designed to allow the same actuator to be used throughout the boom assembly 22.

Another actuator 60 acts between the utility pole 32 and the free boom segment 46. Actuator 60 effects rotation of the utility pole 32 about its longitudinal axis 62 and may also comprise a hydraulic actuator, for example, a slewing ring and hydraulic rotor. In an alternate embodiment, a worm gear or an electrical motor may be used to effect rotation of pole 32. In a practical embodiment the actuator is capable of rotating the pole 32 at least through a full 360 degrees about axis 62. The rotation may be infinitely adjustable. Advantageously, actuator 60 may be self-limiting through the use of a relief valve, which limits the torque which can be applied to rotate the pole 32. The limitation helps prevent damage, for example, to power lines that might be attached to the pole. It is found advantageous to use a clamp 64 to hold the utility pole 32 to the free end 30 of free boom segment 46, the actuator 60 being positioned between the free end 30 and the clamp. Use of clamp 64 permits the utility pole to be easily replaced if needed. Trailer 14 may also be configured to store replacement utility poles 32.

The various hydraulic actuators 28, 56, 58 and 60 are actuated by a hydraulic pump 66 driven by a motor 68. Both the pump 66 and motor 68 may be conveniently mounted on the trailer 14, for example, within the pedestal 23 (see also FIG. 3). In a practical design, motor 68 is an electrical motor powered by batteries 67 in a battery compartment 69 mounted on the trailer 14. In this example, four batteries are configured in a 24 volt dc system. The example system is capable of 5 full deployment cycles of the utility pole on a single charge of the batteries. A battery charger 71 for controlling the voltage and current applied to recharge the battery is also positioned within the battery compartment 69. The battery charger 71 may be connected to a generator 73 powered by an internal combustion engine 79. Additionally, solar panels 53 may be mounted on the trailer (atop the battery compartment 69 in this example) to assist in battery charging. Other power options include direct electrical service power or power from another vehicle or a towed compressor or generator and connectable to the battery charger 71 for recharging the battery or directly to the electrical motor 68 for operating the mobile utility pole. Mobile utility pole 10 also has an electrical system which powers electrical components such as lights and a control unit (70a, 70b, described below). In a practical design the electrical system may be powered by the generator 73, or a separate electrical system comprising a 12 volt direct current system having two deep cycle batteries and an automatic 120 volt alternating current battery charger may also be practical.

As shown in FIGS. 1 and 2, the utility pole 10 also includes a control unit 70a, 70b, for controlling operation of the motor 68, hydraulic pump 66 and actuators 28, 56, 58 and 60 as described below. Control unit 70b may be mounted on the trailer 14 as shown in FIG. 2, but, for safety reasons, is preferably a wireless remote unit 70a as shown in FIG. 1. In a practical embodiment, the wireless remote control unit 70a comprises a 2.4 gHz 100 mW radio frequency transmitter 65 with 18 output channels. The actuators are controlled via control valves 75 mounted on the base 16. The valves 75 provide proportional control, either manually at the valves themselves or via the control units 70a and 70b. Proportional control of the actuators allows the speed and position of boom rotation to be infinitely adjustable within a practical operating range. Hydraulic lines (not shown for clarity) extend between the hydraulic pump 66 and the valves 75 and from the valves to the various actuators to effect controlled operation of the boom assembly 22. Storage lockers 77 may also be mounted on base 16 to store spare parts such as roller assemblies 41, as well as fuel for the generator.

Figure 3:
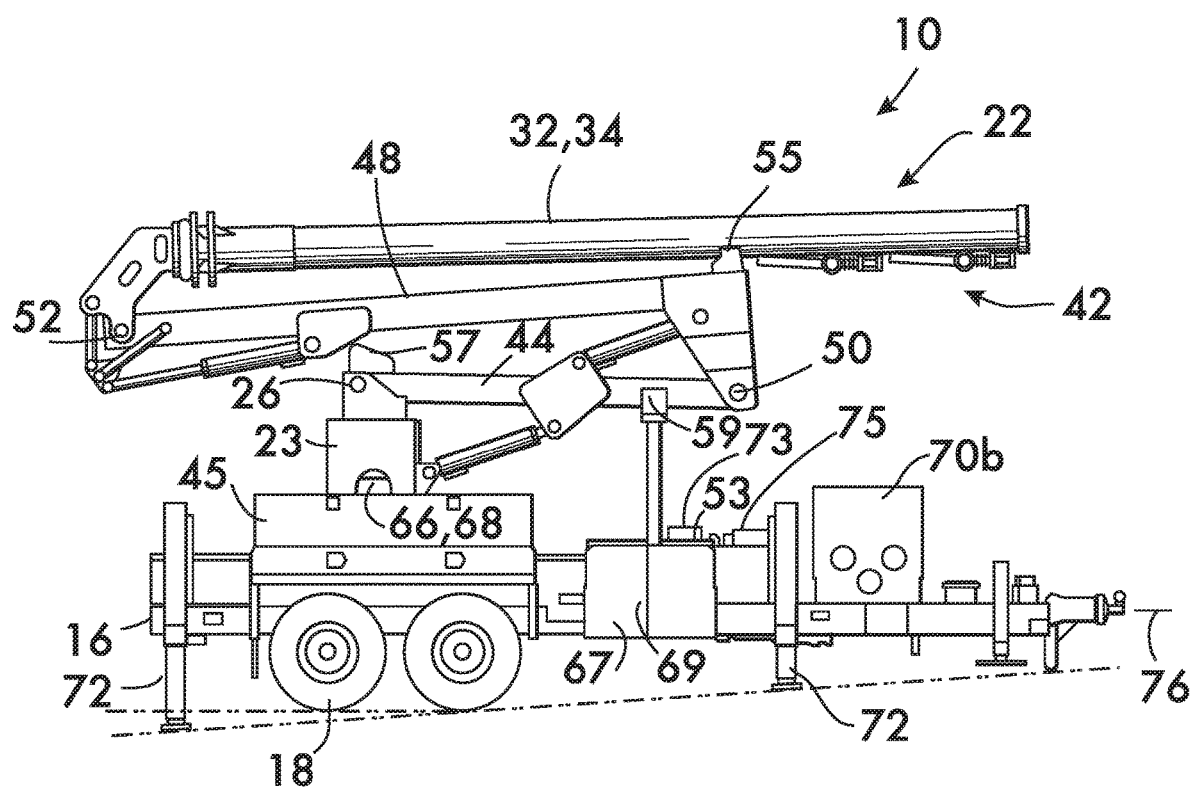
FIGS. 3-6 are side views illustrating deployment of the mobile utility pole of FIG. 1.

A plurality of leveling legs 72 are mounted on base 16. As shown in FIG. 3, the legs are extendable and permit the mobile pole 10 to be leveled about the pitch and roll axes 74 and 76 (see also FIG. 1) when the mobile pole is deployed on sloping or irregular ground. In a practical design leveling legs 72 are deployed hydraulically but may alternately be deployable mechanically or hydraulically. In a practical design provisions to mechanically lock the legs 72 may be made at the hydraulic valves controlling their deployment.

FIG. 2 shows the mobile pole 10 in its travel configuration wherein the boom segments 42 are pivoted so as to be substantially parallel with one another and form a compact configuration. To avoid potential damage to the joints and actuators connecting the boom segments due to dynamic loads experienced during transport, each boom segment is supported and immobilized by a respective lock. Column 34 is supported on a lock 55 attached to the intermediate boom segment 48. In turn, intermediate boom segment 48 is supported on a lock 57 mounted on the terminal boom segment 44. Terminal boom segment 44 is supported on a lock 59 mounted on a stanchion 61 which extends from the base 16 of the trailer 14. The locks 55, 57 and 59 and stanchion 61 cooperate to provide a load path to the base 16 and thereby relieve the stress on the various gussets and actuators which would otherwise be supporting the boom segments 42 during transport.

Figure 4:
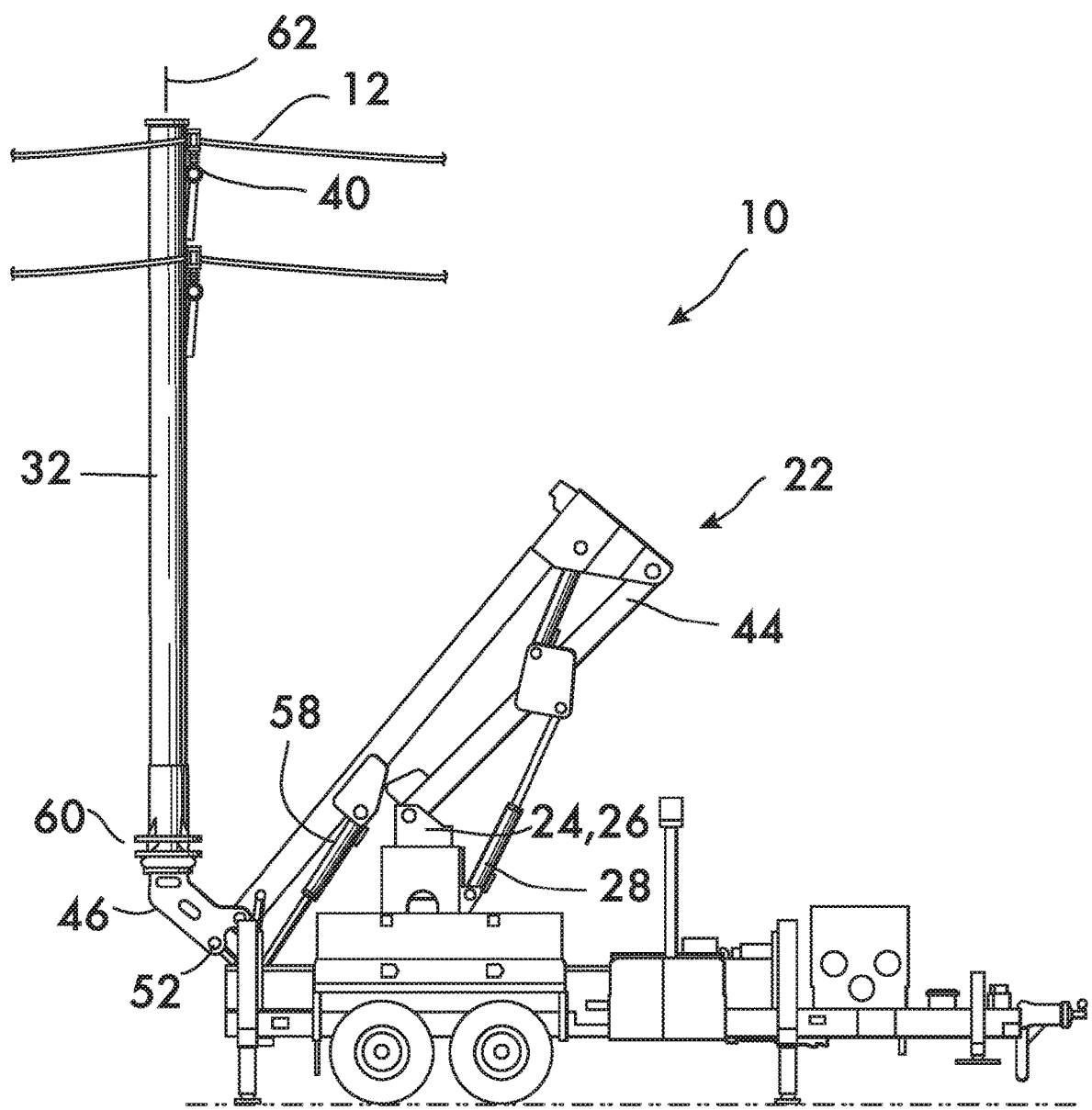
Figure 5:
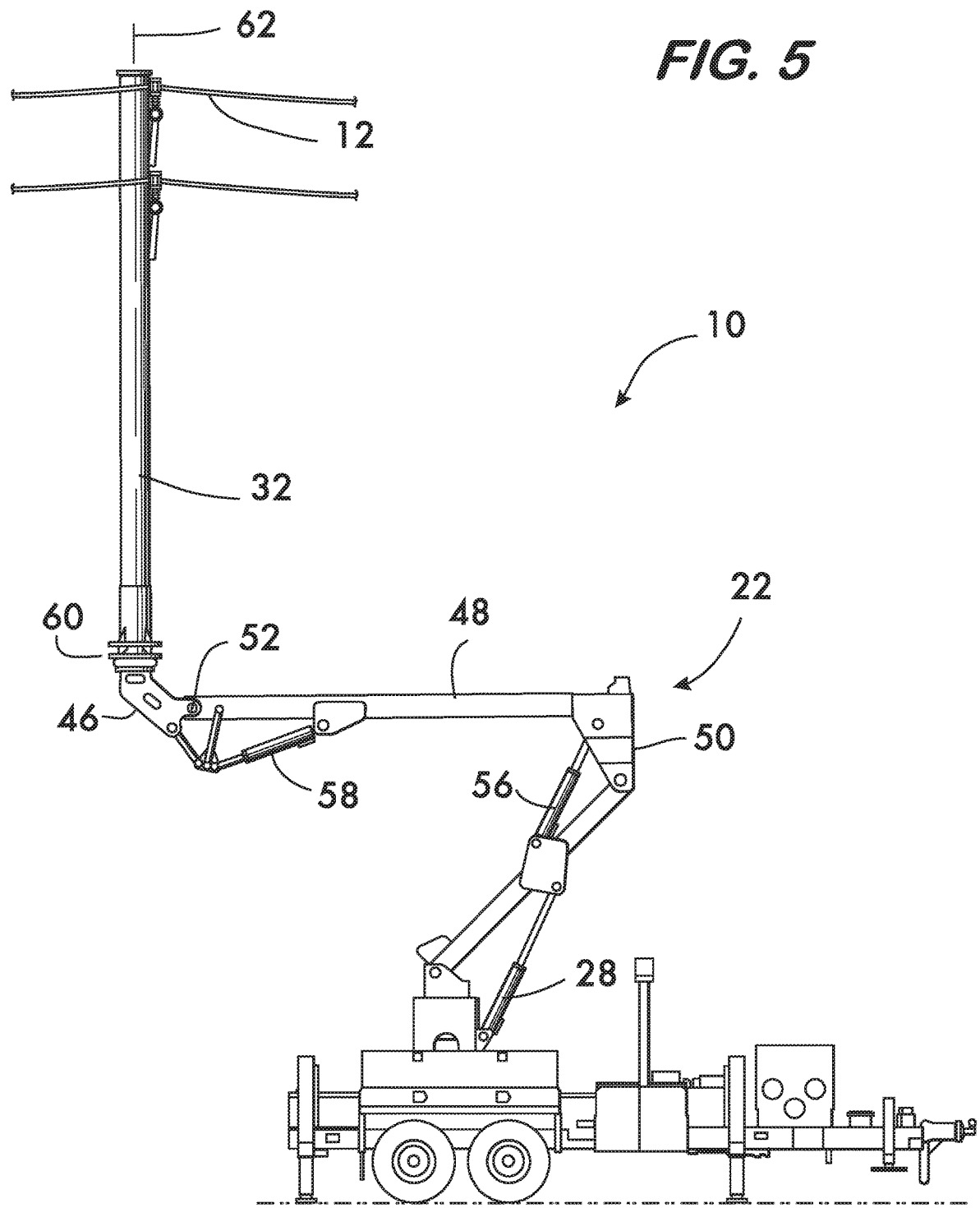
Figure 6:
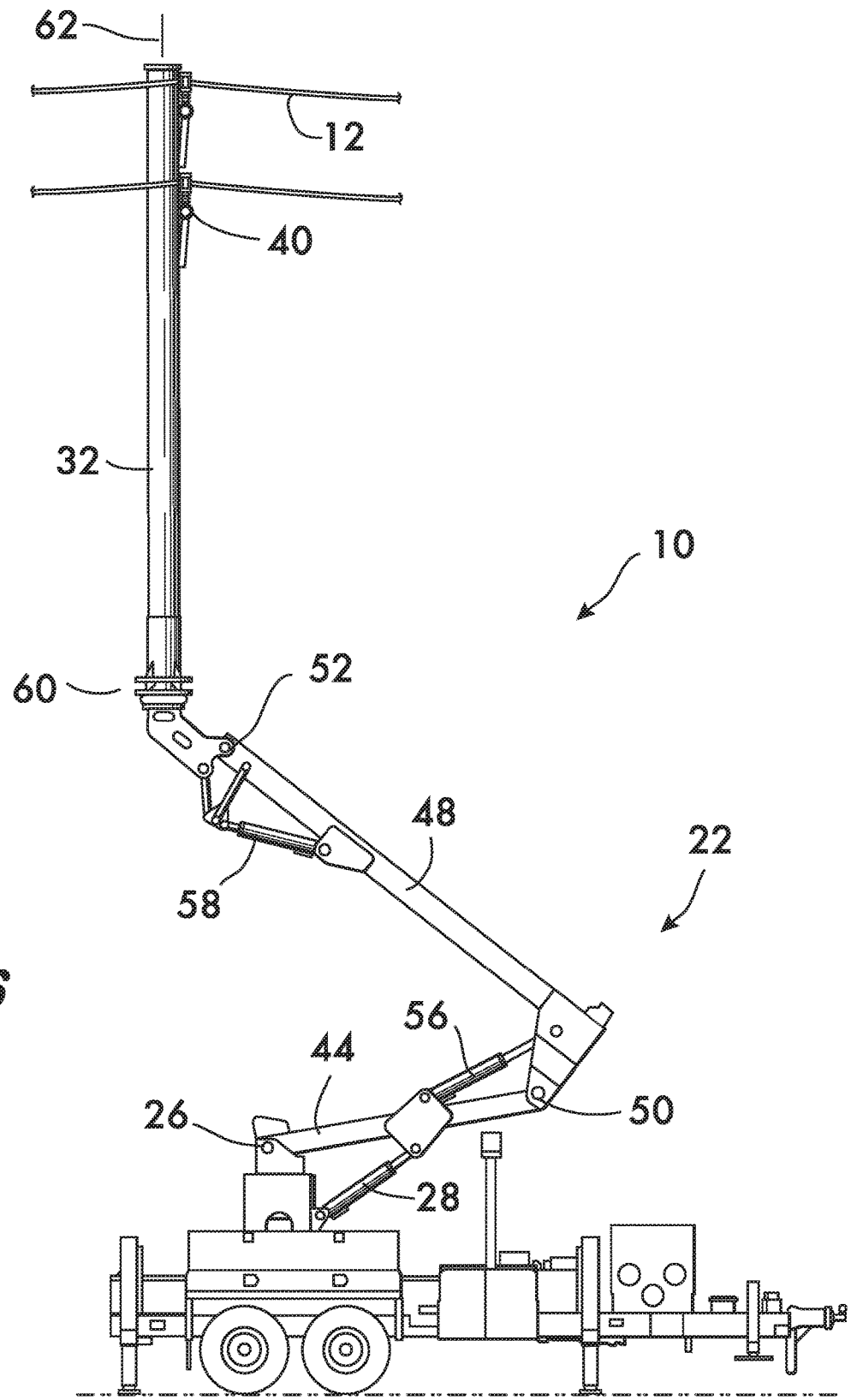

In operation, mobile utility pole 10 is towed in its travel configuration (shown in FIG. 2) to a location where an existing utility pole is to be replaced. The trailer 14 is maneuvered into position and the leveling legs 72 are deployed as shown in FIG. 3. Boom locks 55, 57, and 59 are unlocked to permit rotation of the boom segments 42. As shown in FIG. 4, actuator 28 is used to pivot the boom assembly 22 (acting through terminal boom segment 44) about axis 26 at terminal end 24, and actuator 58 is used to pivot free boom segment 46 about axis 52. As shown in FIG. 5, actuator 56 is used to pivot the intermediate boom segment 48 about axis 50. As shown in FIG. 6, the various actuators 28, 56 and 58 are used in cooperation to adjust the height and vertical orientation of the utility pole 32, and actuator 60 is used to orient the cross member 40 about longitudinal axis 62 to accept the power lines 12 as shown in FIG. 1. Operation of the mobile utility pole 10 is advantageously performed wirelessly via the remote control unit 70a (see FIG. 1) or the control unit 70b on the trailer 14. Wireless control is preferred because it affords greater safety and comfort to the operator, who can be at a safe distance from the mobile utility pole 10 in the event of an accident.

Figure 7:
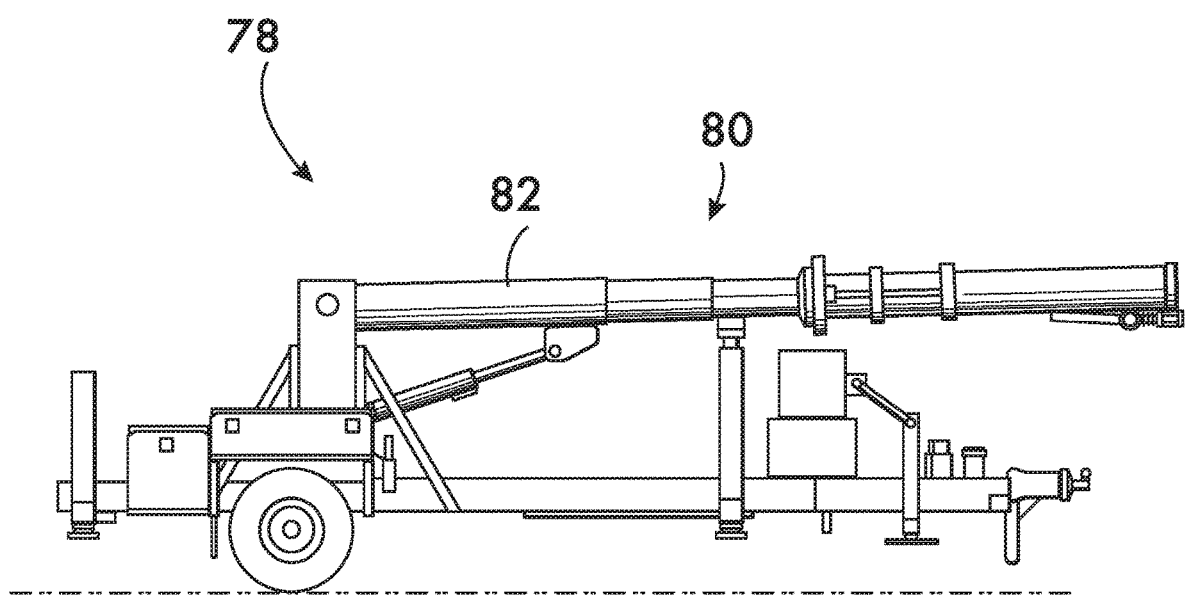
FIG. 7 is a side view of another embodiment of a mobile utility pole according to the invention shown in its travel configuration.
Figure 8:
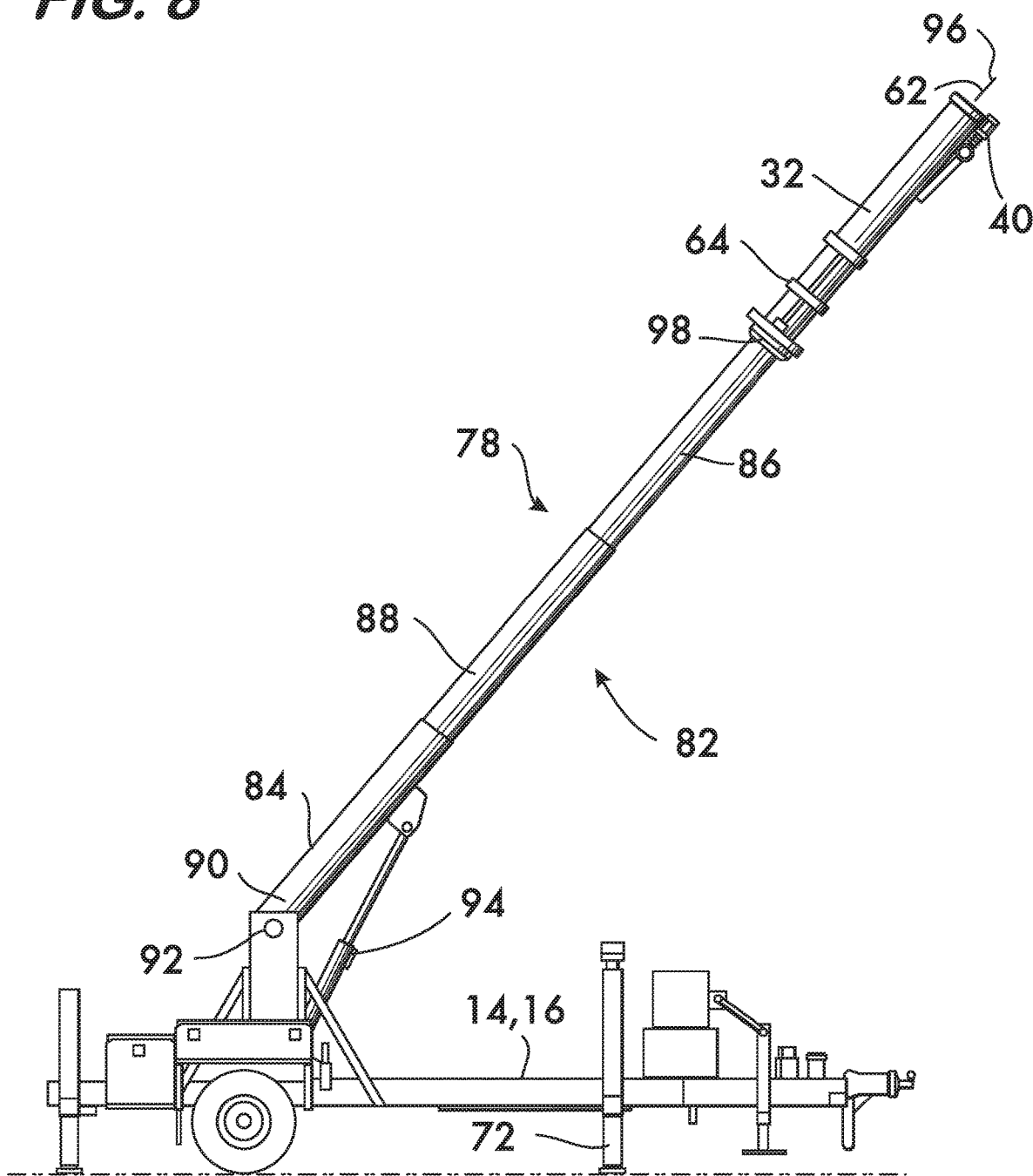
FIG. 8 is a side view of the mobile utility pole of FIG. 7 being deployed for use.

FIGS. 7 and 8 illustrate another example embodiment of the mobile pole 78 according to the invention. FIG. 7 shows the mobile pole 78 in its travel configuration. Mobile pole 78 differs from the embodiment 10 described above in that the boom assembly 80 comprises a plurality of boom segments 82 telescopically positioned one within another. (Other aspects of mobile pole 78 are substantially the same as embodiment 10 and are not described in detail again.) As shown in FIG. 8, the example embodiment 78 comprises three boom segments, a terminal boom segment 84, a free boom segment 86, and an intermediate boom segment 88.

Terminal boom segment 84 has a terminal end 90 pivotably mounted on the base 16 of the trailer 14 for pivoting motion about an axis 92. As indicated by a comparison of FIGS. 7 and 8, a first actuator 94 acting between the trailer 14 and the terminal boom segment 84 effects pivoting motion of the boom assembly 82. In this example actuator 94 is a hydraulic actuator, but other types of actuators, such as an electric motor acting through a gear and pinion arrangement, are also feasible. Intermediate boom segment 88 is telescopically positioned within the terminal boom segment 84. A second actuator (not shown) acts between the terminal boom segment 84 and the intermediate boom segment 88 to extend and retract the intermediate boom segment 88 along the longitudinal axis 96 of the terminal boom segment 86. The second actuator may be hydraulic or electro-mechanical for example. Free boom segment 86 is telescopically positioned within the intermediate boom segment 88. A third actuator (not shown) operates between the intermediate boom segment 88 and the free boom segment 86 to extend and retract the free boom segment 86 along the longitudinal axis 96 of the terminal boom segment 84. Again, the third actuator can be hydraulic or electro-mechanical.

As with the embodiment described above, the utility pole 32 is mounted on the end of the free boom segment 86. Another actuator 98 acts between the utility pole 32 and the free boom segment 86. Actuator 98 effects rotation of the utility pole 32 about its longitudinal axis 62 and may also comprise a hydraulic actuator, electro-mechanical actuator or other type of actuator. It is found advantageous to use a clamp 64 to hold the utility pole 32 to the free end of free boom segment 86, the actuator 98 being positioned between the free end and the clamp. Use of clamp 64 permits the utility pole to be easily replaced if needed.

In operation the mobile pole 78 is towed to the site where a utility pole is to be replaced. Leveling legs 72 are deployed, and the first actuator 94 may be used to pivot the boom assembly 80 about its pivot axis 92 to position the boom assembly 80 in a vertical configuration. The second and third actuators may then be used to extend the intermediate and free boom segments 88 and 86 along axis 96 to the desired height to receive the wires to be supported. Actuator 98 is used to rotate the utility pole 32 and properly orient the cross member 40 as needed. Once the new utility pole is in place the free and intermediate boom segment 86 and 88 are retracted, the boom assembly 80 is pivoted into its travel configuration, leveling legs 72 are withdrawn and the trailer 14 is hitched to a prime mover and transported to the next replacement site.

Mobile utility poles, like the examples 10 and 78 described herein can replace more expensive equipment, such as a mobile crane, when used to replace a utility pole which might otherwise require two cranes, one to hold the pole being replaced and the other crane to position the replacement pole in the previously occupied hole. Mobile utility poles may also be deployed and remain at a site where a downed pole is to be replaced until such time as assets become available to replace the pole. Use of mobile utility poles according to the invention also allow immediate repairs to be made without permission from underground utilities because no excavation is required. This saves time, especially during a disaster, when it might be difficult to obtain clearance to dig. In this use the mobile pole according to the invention provides for uninterrupted power to users as the site waits its turn for repair, for example, in the aftermath of a storm when the resources of a utility company may be stretched to their limits by the extent of the damage. The ability to effect immediate temporary repair will save lives, livestock and property. Mobile utility poles according to the invention are not limited in use to power utilities, and may also be used to provide temporary communication, for example, deployed as a cell tower (base transceiver station) while a fixed cell tower is off line for service or repair, or to alleviate a dead zone while a cell tower is being constructed. The mobile utility pole according to the invention may be used to support and/or power communication equipment including antennae, sets of transceivers, digital signal processors, control electronics, as well as a GPS receiver for timing.

What is claimed is:

1. A mobile pole for temporary support of electrical lines, said mobile pole comprising:
  a trailer comprising a base mounted on a plurality of wheels, an electric motor, an electrical battery, an electrical generator, and a hydraulic pump mounted on said trailer, said battery powering said electrical motor, said hydraulic pump driven by said electric motor, said electrical generator for recharging said battery;
  a boom assembly having a terminal end pivotably mounted on said trailer and a free end, said boom assembly comprising:
    a plurality of boom segments pivotably attached to one another, said plurality of boom segments including a terminal boom segment comprising said terminal end of said boom assembly and a free boom segment comprising said free end of said boom assembly;
    an intermediate boom segment having one end pivotably attached to said terminal boom segment and an opposite end pivotably attached to said free boom segment;
    a first hydraulic actuator acting between said trailer and said boom assembly for pivoting said boom assembly relatively to said trailer;
    a second hydraulic actuator acting between said terminal boom segment and said intermediate boom segment;
    a third hydraulic actuator acting between said intermediate boom segment and said free boom segment,
    said hydraulic pump being in fluid communication with said hydraulic actuators;
  a utility pole mounted on said boom assembly, said utility pole comprising a column having a first end attached to said free end of said boom assembly and a second end oppositely disposed, at least a first cross member being attached to said utility pole proximate said second end of said column; and
  a control unit for controlling said electric motor, said hydraulic pump and said hydraulic actuators.

2. The mobile pole according to claim 1, wherein said electrical generator comprises an internal combustion engine.

3. The mobile pole according to claim 1, further comprising at least one solar panel mounted on said trailer for recharging said battery.

4. The mobile pole according to claim 1, further comprising a battery charger mounted on said trailer, said battery charger being connectable with any one of an electrical generator, and direct electrical service for recharging said battery.

5. The mobile pole according to claim 1, wherein said control unit is mounted on said trailer.

6. The mobile pole according to claim 1, wherein said control unit comprises a remote unit separate from said trailer, said remote unit comprising a radio frequency transmitter for wirelessly controlling said mobile pole.

7. The mobile pole according to claim 1, wherein said utility pole comprises fiberglass or wood.

8. The mobile pole according to claim 1, further comprising a clamp attached to said free end of said boom assembly, said clamp holding said utility pole to said free end of said boom assembly.

9. The mobile pole according to claim 1, further comprising a plurality of leveling legs attached to said trailer.

10. The mobile pole according to claim 1, further comprising a least a first gusset plate attached to said boom assembly, said first actuator acting between said trailer and said first gusset plate.

11. The mobile pole according to claim 1, further comprising a plurality of gusset plates, each said gusset plate being attached to a respective boom segment, said actuators being attached to said boom segments via said gusset plates.

12. The mobile pole according to claim 11, wherein at least one of said gusset plates is pivotably attached to one of said boom segments.

13. The mobile pole according to claim 1, further comprising a pedestal mounted on said trailer and extending therefrom, said terminal end of said boom assembly being mounted on said pedestal.

14. The mobile pole according to claim 1, further comprising at least one roller assembly mounted on said cross member, said at least one roller assembly comprising:
   a bracket;
   a latch mounted on said bracket and movable between an open and a closed position;
   a plurality of rollers mounted on said bracket for engaging at least one of said electrical lines.

15. The mobile pole according to claim 1, wherein said column is rotatably attached to said free end of said free boom segment for rotation about a longitudinal axis of said column.

16. The mobile pole according to claim 15, further comprising an actuator acting between said free boom segment and said column for effecting rotation of said column about said longitudinal axis.

17. The mobile pole according to claim 16, wherein said actuator comprises a hydraulic actuator.

18. The mobile pole according to claim 1, further comprising a second cross piece attached to said utility pole in spaced relation to said first cross piece.

\* \* \* \* \*